United States Patent [19]

Hedstrom et al.

[11] 4,411,091

[45] Oct. 25, 1983

[54] ANIMAL TRAP WITH SUPPORT-SUSPENSION LEGS

[76] Inventors: Dennis G. Hedstrom, Rte. 1, Box 114, Iron, Minn. 55751; Rocky O. Hedstrom, Rte. 7, Box 646, Alexandria, Minn. 56308

[21] Appl. No.: 223,279

[22] Filed: Jan. 8, 1981

[51] Int. Cl.³ ............................................. A01M 23/26
[52] U.S. Cl. .......................................... 43/88; 43/89; 43/90; 43/96
[58] Field of Search ........................... 43/88, 89, 90, 96

[56] References Cited

U.S. PATENT DOCUMENTS

| | | | |
|---|---|---|---|
| 589,640 | 9/1897 | Cartier | 43/89 |
| 1,331,324 | 2/1920 | Dickson | 43/89 |
| 1,363,943 | 12/1920 | Whitley | 43/90 |
| 1,409,924 | 3/1922 | Byrne | 43/96 |
| 1,970,672 | 8/1934 | Prestenback | 43/96 |
| 2,357,414 | 9/1944 | McJunkin | 43/86 |
| 2,408,593 | 10/1946 | Barber | 43/88 |
| 2,701,428 | 2/1955 | Mau | 43/90 |
| 3,747,259 | 7/1973 | Pellowski | 43/96 |
| 3,974,592 | 8/1976 | Staats | 43/88 |
| 4,146,990 | 4/1979 | Conibear | 43/88 |
| 4,152,861 | 5/1979 | Miller | 43/88 |

FOREIGN PATENT DOCUMENTS

| | | | |
|---|---|---|---|
| 867032 | 3/1971 | Canada | 43/96 |
| 1082920 | 8/1980 | Canada | 43/88 |
| 62633 | 6/1892 | Fed. Rep. of Germany | 43/88 |

Primary Examiner—James G. Smith
Assistant Examiner—K. Bradford Adolphson
Attorney, Agent, or Firm—Harvey B. Jacobson

[57] ABSTRACT

A pair of levers are provided including corresponding first base ends and second jaw ends. A pivot fastener pivotally connects the base ends of the levers together for relative swinging of the levers between first open positions with the jaw ends displaced away from each other and second closed positions with the jaw ends displaced toward each other into at least closely adjacent positions. Spring structure is operatively connected between the levers yieldingly biasing the latter toward the second positions thereof and releasable latch structure is provided and is operative to releasably latch the levers in the first positions. An elongated rigid support member is also provided and includes a flattened end and a pointed tip end. A pivot fastener pivotally supports the flattened end of the support member relative to the levers for independent swinging of the support member relative to both of the levers about the axis of relative pivoting of the levers and with the axis extending substantially at right angles relative to the flattened end of the support member. The painted tip end of the support member includes first structure for impaling and thus support from the ground and second structure for suspension of the support member from a suitable support structure.

2 Claims, 4 Drawing Figures

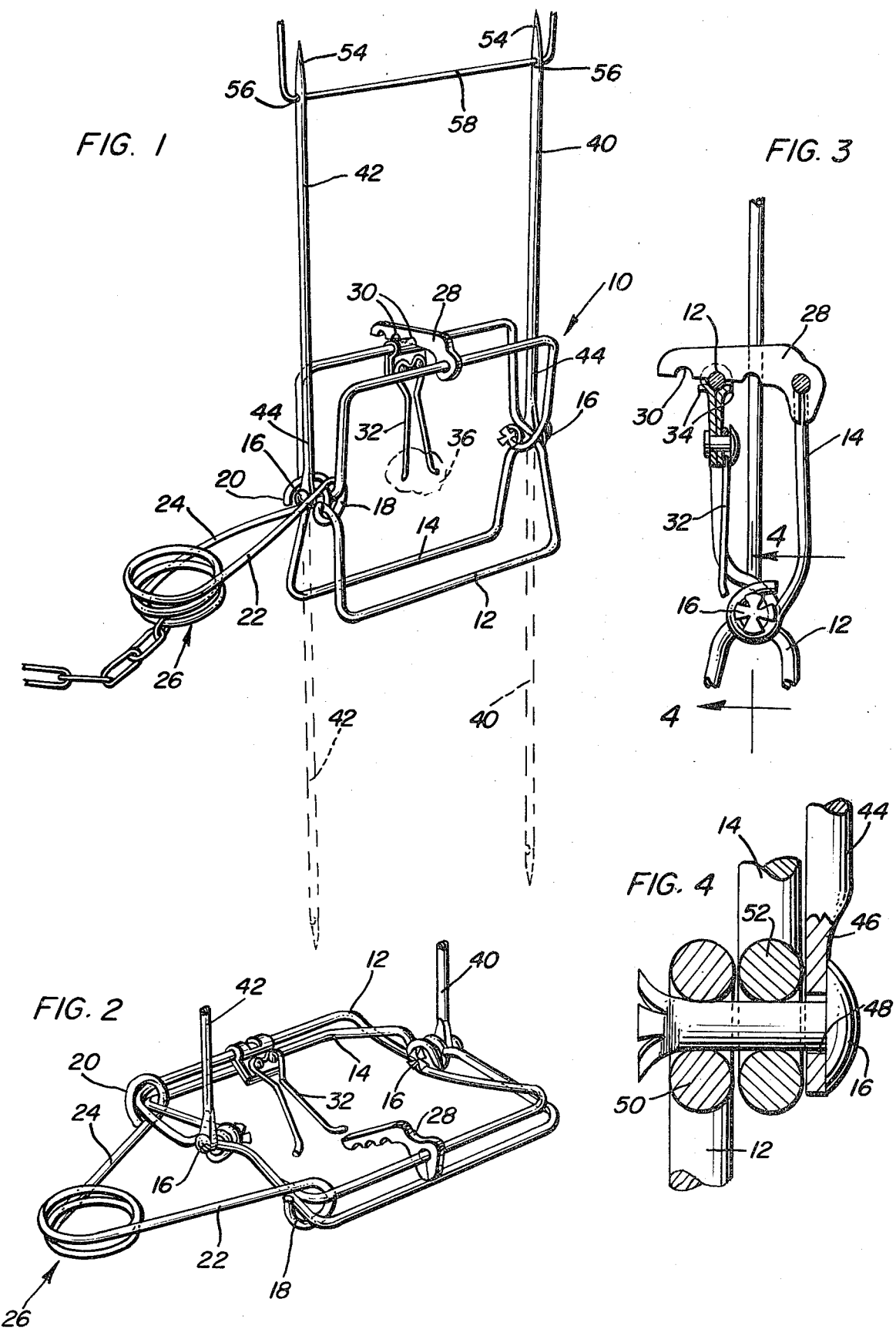

though these patents together with Canadian Pat. No. 867,032 to Grawbarger respond to various presentation of needs to

ANIMAL TRAP WITH SUPPORT-SUSPENSION LEGS

BACKGROUND OF THE INVENTION

Various forms of animal traps heretofore have been provided and many different forms of traps are provided with structures whereby they may be operatively supported from the ground. In addition, various other forms of traps include structure whereby they may be supported or suspended from other suitable support structures. However, few, if any, animal traps are constructed in a manner whereby the trap may be ground supported or suspended from a suitable support structure, such as a tree limb or a layer of ice in the event it is desired to trap muskrat and to position the trap in a muskrat runway below the surface of ice

DESCRIPTION OF THE PRIOR ART

In the past, it is known to support animal traps upon stakes and it is known to support Conibear-type animal traps utilizing resilient fingers mounted upon an elongated body adapted to be supported from a stake, as disclosed in Miller No. 4,152,861 and in Staats No. 3,974,592. Each of these patents discloses that Conibear-type animal traps mounted on stakes presents a need that adequately is not met in the prior art, though these patents together with Canadian Pat. No. 867,032 to Grawbarger respond to various presentation of needs to support Conibear animal traps. The Conibear patent No. 3,010,245 is recognized as presenting a basic concept of the Conibear animal trap as a most effective trap of a type which has been widely recognized as humane and preserving the quality of the pelt of the animal, and is a trap located within animal passages and runways, and is widely used in underwater trapping of muskrats, mink, beaver and other water related animals.

Conibear is a name used in trade as a non-proprietary name by which certain traps are known and identified and called so among traders and workers in the art at least as shown by U.S. Pat. Nos. 3,010,254; 3,974,592; 4,152,861 and Canadian patent No. 867,032, hereinafter known as the Conibear-type of trap. The Conibear trap includes a pair of wire jaws biased toward a closed condition by a spring, and when set, the trap resembles a pair of wire rectangles in side-by-side relationship with the trigger element extending toward the middle of the rectangles. Upon the trigger being displaced, the wire jaws quickly close to entrap the animal.

Examples of previously known forms of traps including some of the general structural and operational features of the instant invention are disclosed in U.S. Pat. Nos. 1,409,924, 1,970,672, 2,357,414, 2,408,593, 3,747,259, 3,974,592, 4,146,990 and 4,152,861.

Of the above noted patents '259, '592, '861 and '990 may be termed as Conibear type traps and include basic jaw and jaw spring actuating components which are similar to the corresponding components of the instant invention. In addition, these patents also include trigger-type latch structure which is substantially similar to the trigger-type latch structure of the instant invention.

However, these previously known forms of Conibear type traps do not include structure which adapt them for ready support from the ground or suspension from a suitable support structure disposed thereabove, such as a tree limb or from any dept under a layer of ice. Accordingly, a need exists for a Conibear-type of trap including structure which will enable it to be readily supported from the ground or suspended from a suitable support structure. Further, a need exists for a Conibear trap of this type including support structure therefor which may be readily engaged with the ground or an overhead support structure in a minimum of time to thereby facilitate the setting of the trap quickly and efficiently so as to leave minimum human scent at the sight of the trap.

BRIEF DESCRIPTION OF THE INVENTION

The Conibear-type of trap is generally considered to include a pair of substantially identical rectangular jaw frames crossed and pivotally interconnected by aligned pivot fasteners at the midportions of the opposite sides of the frames. A strong butterfly-type of spring including integral rings on the free ends of the arms thereof has its arm end rings slidably engaged with the frames in a manner whereby the spring strongly yieldingly biases the frames from the open positions thereof to the closed animal trapping positions thereof.

SUMMARY OF THE INVENTION

The main object of this invention, however, is to provide a Conibear-type trap including depending ground impaling spikes whose upper ends are pivotally attached to the aforementioned pivot fasteners and, therefore, which may be utilized in supporting the Conibear trap in the desired elevated position above a ground surface.

Another object of this invention is to provide a Conibear trap in accordance with the preceding objects and whose pivotally supported ground spikes may be inverted and are provided with structure at their free ends adapting the spikes for suspension from an elevated support structure, whereby the trap may be suspended from such an elevated support structure.

Still another important object of this invention is to provide a Conibear-type of trap including support structure therefor which will enable the placement of the trap in the desired ground supported or suspended positions with ease and in a very short time to thereby enable the trap to be set in a manner that will leave only a minimal amount of human scent at the site of the trap.

A final object of this invention to be specifically enumerated herein is to provide a Conibear-type of trap in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the trap of the instant invention with the support spikes thereof illustrated in inverted position in solid lines and in upright position in phantom lines;

FIG. 2 is a fragmentary, perspective view of the trap with the jaws thereof in closed position;

FIG. 3 is an enlarged, fragmentary, vertical sectional view of the trap taken substantially upon a plane passing through the center thereof; and FIG. 4 is an enlarged, fragmentary, vertical sectional view taken substantially upon the plane indicated by the section line 4—4 of FIG. 3.

DETAILED DESCRIPTION OF THE INVENTION

Referring now more specifically to the drawings, the numeral 10 generally designates a Conibear type of trap including a pair of generally rectangular frames 12 and 14 crossed and pivotally connected at the midportions of corresponding sides thereof through the utilization of pivot fasteners 16. The frames 12 and 14 have integral eye portions 18 and 20 carried by the free ends of the arms 22 and 24 of a strong butterfly spring referred to in general by the reference numeral 26 encircled thereabout and slidably engaged therewith. A latch arm 28 is pivotally attached at one end to the frame 14 and includes laterally outwardly opening notches 30 at its other end releasably engageable with the frame 12 in the manner illustrated in FIGS. 1 and 3 of the drawings. A bait supporting trigger 32 is pivotally supported from the frame 12 and includes a pair of cam portions 34 engageable with the latch arm 28 in order to release the same responsive to swinging of the trigger 32 as an animal attempts to remove the bait 36 from the trigger 32.

The foregoing is to be considered as conventional structure of a Conibear-type of trap as mentioned above.

The trap 10, however, includes a pair of elongated rigid support arms 40 and 42 including corresponding base ends 44 flattened as at 46 and provided with pivot fastener receiving bores 48 therethrough. The pivot fasteners 16 not only extend through the corresponding integral ring portions 50 and 52 of the frames 12 and 14, but also through the bores 48, whereby the support arms 40 and 42 are pivotally supported for independent swinging relative to the frames 12 and 14. The support arms 40 and 42 are substantially parallel to each other and include pointed free end portions 54 which may be utilized to impale the ground beneath the trap 10 when the support arms 40 and 42 are in the depending positions thereof illustrated in phantom lines in FIG. 1 of the drawings. In addition, each of the pointed free end portions 54 includes a diametric bore 56 formed therethrough and a length of bendable wire 58 may be passed through the bores 56 in order to suspend the support arms 40 and 42 from any depth under a layer of ice or other suitable structure disposed above the trap 10 when the support arms 40 and 42 are in the positions thereof illustrated in solid lines in FIG. 1 of the drawings.

It will also be noted that the trap 10 is pivotally supported as a unit from the support arms 40 and 42 and, therefore, that the support arms 40 and 42 may be disposed in any inclined position while still enabling the trap 10 to be positioned in either the position thereof illustrated in FIG. 1, a position inverted relative to the position thereof illustrated in FIG. 1 or a position with the pivot fasteners 16 vertically disposed as well as any variations of these positions. Accordingly, the support arms 40 and 42 provide structure whereby the trap 10 may be supported in any desired location from substantially any suitable support structure adjacent that location.

When the trap is to be utilized in the runways of muskrats, the wire 58 facilitates the support of the trap 10 from any depth under a layer of ice above the runways. In addition, the support arms 42, without the wire 58, may be impaled in the ground for support of the trap 10 in varied elevated positions above the ground, and the support arms 40 and 42 may be readily camouflaged and in no way effect proper actuation of the trap 10 by the spring 26.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A trap for suspension from an overhead support and, alternately for support from the ground in vertically spaced relation relative to the ground, said trap comprising a pair of levers, said levers including corresponding first base ends and second jaw ends, fastener means pivotally connecting said base ends together for relative swinging of said levers between first open positions with said jaw ends displaced away from each other and second closed positions with said jaw ends displaced toward each other into at least closely adjacent positions, spring means operatively connected between said levers yieldingly biasing the latter toward said second positions, releasable latch means operative to releasably latch said levers in said first positions, each of said levers including a generally U-shaped portion including a pair of parallel legs and a bight portion extending between and interconnecting one pair of corresponding base ends of said legs, said bight portions comprising said jaw ends of said levers, said fastener means comprising a pair of fasteners pivotally connecting the free ends of the legs of corresponding levers, a pair of elongated rigid support members each including a flattened end having a transverse aperture for said fastener means and a pointed tip end, said fastener means extending through said apertures of the flattened ends and pivotally supporting said flattened ends of said elongate support members for swinging of said elongated support members relative to both of said levers about the axes of relative pivoting of said levers and with said axes extending substantially at right angles relative to said flattened ends of said support members, said pointed tip ends of said elongated support members each including a transverse bore therein, the pointed tip ends being provided for impaling in the ground to provide suport from the ground, and means including a length of bendable wire adapted for passing through the transverse bores of the elongated support members providing for selective adjustability in suspension from a support structure.

2. The combination of claim 1 wherein said U-shaped portions comprise integral portions of substantially rectangular frames each including a corresponding second U-shaped portion opposing and opening toward the first mentioned U-shaped portion.

* * * * *